L. W. SWARTS.
VEHICLE VISOR.
APPLICATION FILED JULY 3, 1920.
1,413,070.
Patented Apr. 18, 1922.
2 SHEETS—SHEET 2.
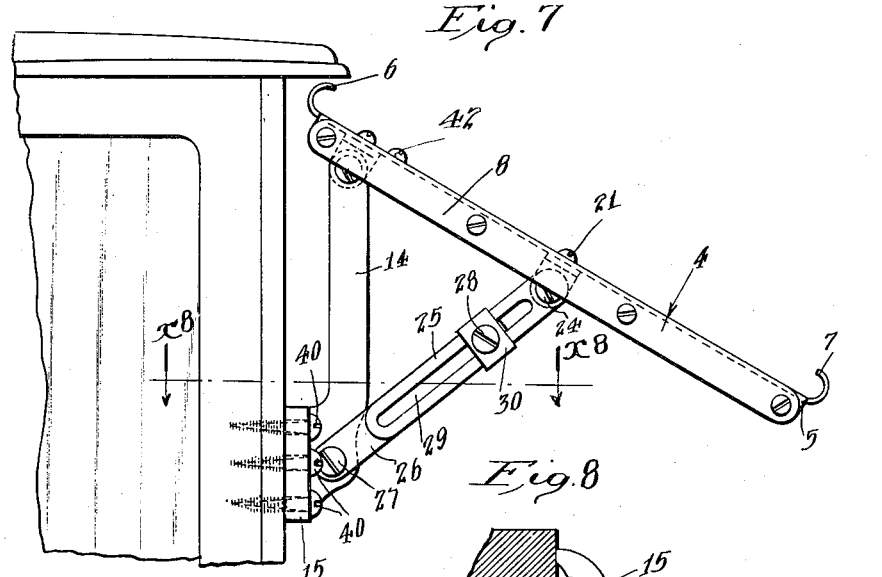
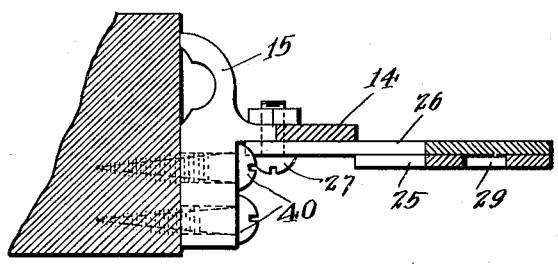
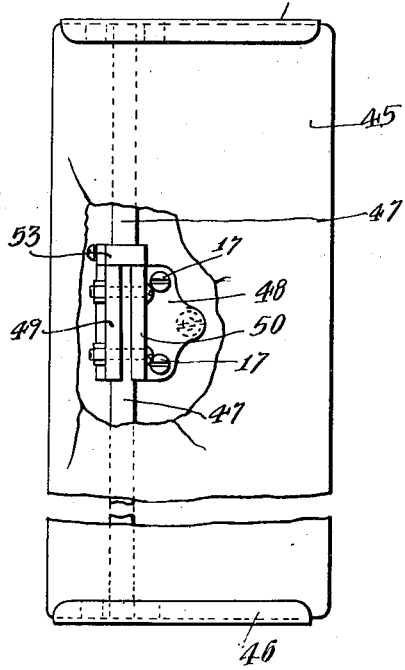
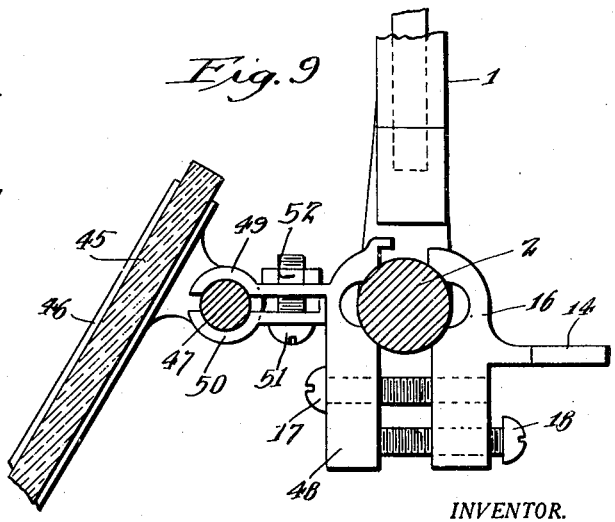
INVENTOR.
Laurence W. Swarts
BY Frederick Whyou
ATTORNEY.

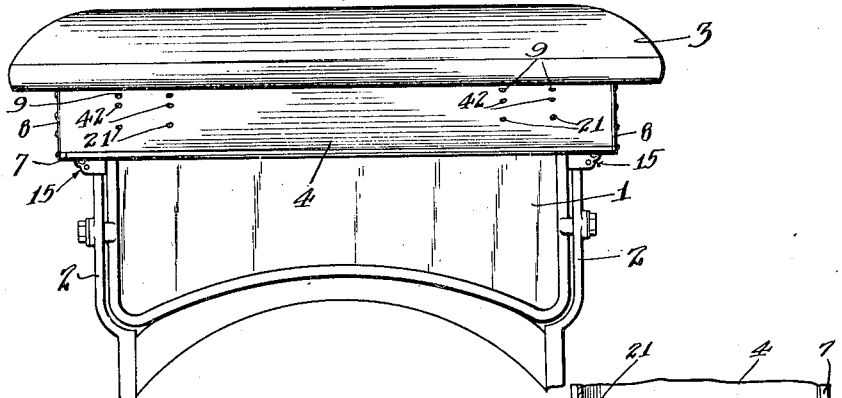
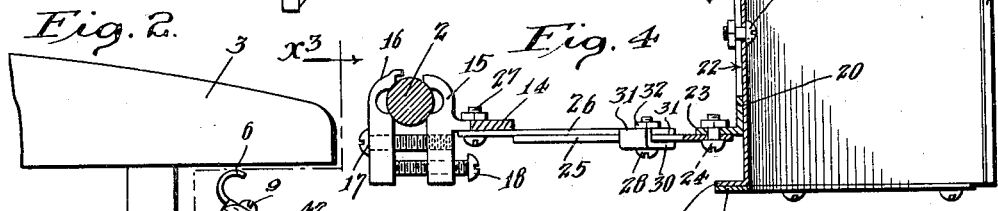
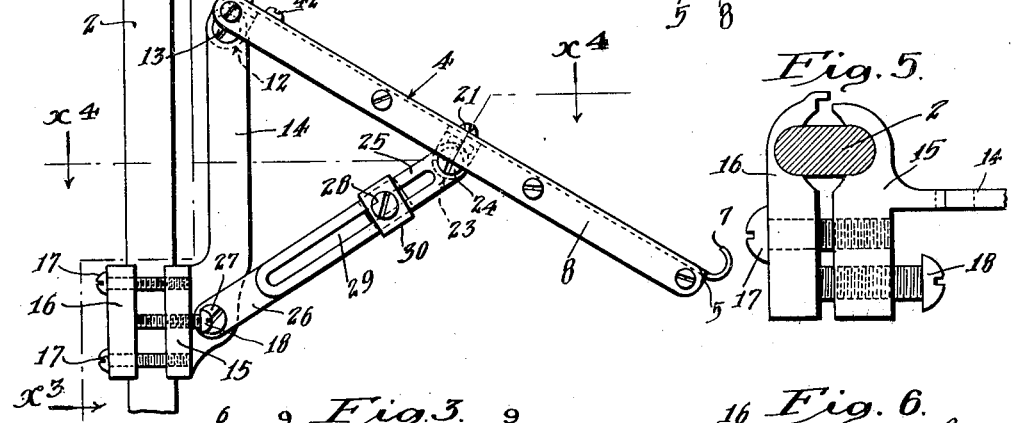
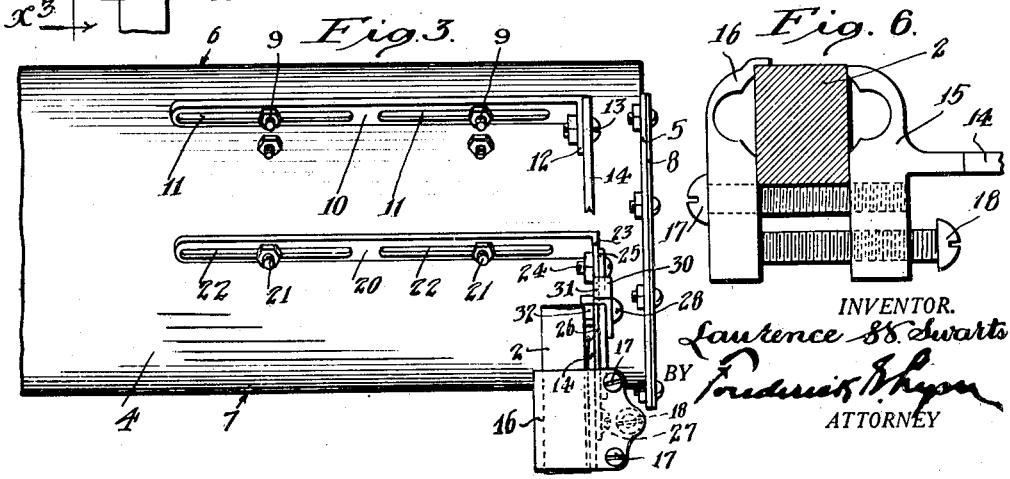

UNITED STATES PATENT OFFICE.

LAURENCE W. SWARTS, OF LOS ANGELES, CALIFORNIA.

VEHICLE VISOR.

1,413,070.

Specification of Letters Patent. Patented Apr. 18, 1922.

Application filed July 3, 1920. Serial No. 393,840.

*To all whom it may concern:*

Be it known that I, LAURENCE W. SWARTS, a citizen of the United States, residing at Los Angeles, in the county of Los Angeles and State of California, have invented a new and useful Vehicle Visor, of which the following is a specification.

This invention relates to vehicle visors adapted for attachment to vehicle tops and is particularly directed to visors having adjusting features adapting it for attachment to tops of different widths.

The object of the invention is to provide a visor hingedly supported at opposite sides of a windshield frame and extending laterally across the windshield above the horizontal range of vision of the driver, with each hinge connection independently laterally adjustable relative to the visor, permitting their attachment to windshield frames of different widths.

Another object is to provide a visor having a lateral trough at its forward longitudinal edge as a water shed directing rain falling on the visor, to the sides of the vehicle.

Another object is to provide a visor having a lateral deflecting ledge at its inner longitudinal edge preventing rain, dust, snow, etc., passing over said edge and onto the windshield.

Another object is to provide a visor having extensible means to maintain the visor in angular adjusted position, said means being positioned entirely exterior of the vehicle top.

Another object is to provide a visor pivotally supported on opposed brackets adapted to be clamped on the opposite standards of a windshield support, with the inner faces of the clamp jaws contoured to fit standards of different cross sectional shape.

A further object is to provide a visor pivotally supported on opposed brackets having opposed clamp jaws adapted to be clamped on the opposite standards of a windshield support, one jaw member of each bracket supporting the visor and the opposed jaw of each bracket supporting a vertically disposed wind deflecting member.

Another object is to so design the supporting brackets that while adapted to clampingly engage the standards of a windshield support of an open vehicle, the visor supporting jaw of each bracket may be attached to the framework of a closed vehicle.

Various other objects and advantages will be more fully apparent from the following description of the accompanying drawings, which form part of this disclosure, and which illustrate a preferred form of embodiment of the invention.

Of the drawings.

Figure 1 is a front elevation of the windshield and top of an automobile, showing the visor of the present invention applied.

Fig. 2 is an enlarged side elevation of a portion of the top and windshield support, and the visor attached thereto.

Fig. 3 is an elevation of one end of the visor taken on line $x^3$—$x^3$ of Fig. 2.

Fig. 4 is a plan section on line $x^4$—$x^4$, of Fig. 2, showing one end of the visor and the connection of the retaining link with one of the brackets.

Fig. 5 is a plan section showing one of the brackets engaged with a standard of oval shape.

Fig. 6 is a similar section showing the bracket engaged with a square standard.

Fig. 7 is a side elevation similar to Fig. 2 showing the visor as applied to an enclosed automobile.

Fig. 8 is a plan section on line $x^8$—$x^8$ of Fig. 7.

Fig. 9 is a plan section showing one of the visor supporting brackets applied to a windshield standard, and having a modified form of jaw member adapted for supporting a vertically disposed wind deflecting member.

Fig. 10 is an elevation of the wind deflecting member looking at Fig. 9 from the left.

With reference to the drawings, 1 designates the windshield of an automobile which is supported by the opposed standards 2—2, and 3 designates the top which extends forwardly a short distance beyond the windshield.

The visor panel 4 extends laterally across and is positioned just in front of the windshield closely adjacent the top, in a plane above the horizontal range of vision of the driver and serves to prevent the sun's rays shining directly in the eyes of the driver. The visor is preferably formed of sheet metal and has downwardly projecting end flanges 5 to add rigidity and strength thereto and its inner longitudinal edge is turned upwardly to form a deflecting ledge 6 which serves to prevent rain, dust, etc., being forced over said inner edge and onto the windshield. The forwardly longitudinal edge is turned upwardly to form a lateral trough 7 serving as a water shed for directing rain, falling on the visor, to the sides of the vehicle, so that it will not drip from said forward edge to partially obstruct the vision of the driver.

This preventing of rain dripping from the forward edge of the visor and the preventing of rain being blown over the inner longitudinal edge of the visor and onto the upper part of the windshield, are features of great merit and constitute important advancements in the art, the advantages and utility thereof being at once apparent to those experienced in automobile driving.

To additionally strengthen the visor panel and also for the purpose of embellishment I attach to the outer surfaces of the flanges 5, by bolts as shown or otherwise, strips 8 which may be nickel plated or otherwise finished, to add to the appearance of the device, the visor panel being preferably finished in dark green enamel.

As the supporting and adjusting means comprises duplicate mechanisms at opposite ends of the visor, only one set of such mechanisms need herein be described.

Clamped to the under surface of the visor panel 4 parallel to and adjacent its inner edge, by bolts 9 and companion nuts, is a pivot bearing slide 10 having longitudinal slots 11—11 through which the bolts 9 project, said slide being thus capable of lateral adjustment relative to the visor panel. Projecting downwardly from the outer end of the slide 10 is an ear 12 which pivotally connects by bolts 13 to an arm 14 extending upwardly from one jaw member 15 of a supporting bracket comprising said jaw member and an opposed jaw member 16. The opposed jaw members clampingly embrace the windshield standard 2 and are drawn together by bolts 17—17, loosely extending through the jaw member 16 and threaded in the jaw member 15 and an abutment bolt 18 threaded in the jaw member 15 engages the jaw member 16 and is adjusted to maintain the two members in parallel alinement. As shown in Figures 5, 6, the opposed jaw surfaces are contoured to provide surfaces for engaging windshield standards of different cross sectional shapes, this being of advantage in producing a universal device adapted for attachment to various types of windshield standards.

A second pivot bearing slide 20 is clamped to the under surface of the visor panel 4 at approximately its longitudinal center, by bolts 21 and companion nuts, with said bolts projecting through slots 22—22 permitting a longitudinal adjustment of the slide relative to the visor panel. The slide 20 has a downwardly projecting ear 23 and pivotally connected to said ear by a bolt 24 is one link member 25 of an extensible strut comprising said link member and a companion link member 26 which is pivotally connected at 27 to the bracket jaw member 15. The two link members 25—26 are slidably connected by a clamp bolt 28 which extends through the free end of the link member 26 and through an elongated slot 29 in the link member 25, the bolt also extending through a shoe 30 having inwardly projecting flanges 31—31 engaging the edges of the link members to maintain the links in coincident alinement. A nut 32 cooperates with the bolt 28 to clamp the link members rigidly together in set position, maintaining the visor panel 4 in angular adjusted position.

In attaching the above described visor to a windshield support, the bolts 9 of the slides 10 and the bolts 21 of the slides 20 are loosened so that the supporting brackets may be independently moved closer together or spread apart to engage the standards of a narrower or wider windshield, as the case may be, and the bolts 18 and 18 of each bracket tightened to clamp the brackets to the respective standards. The slide bolts 9 and 21 are then tightened to complete the installation of the complete visor.

It will be evident that this mechanism provides supporting brackets which may be independently laterally adjusted to aline with standards of windshields of various widths and that after the brackets are attached the visor panel may be laterally adjusted relative to the brackets.

The extensible strut members constitute means for maintaining the visor panel in angular adjusted position, the two link members thereof being relatively slidable and subsequently clamped in adjusted position by the clamp bolt and nut 28—32.

In attaching the visor to a closed vehicle, as illustrated in Figs. 7 and 8, the bracket jaw member 16 is not utilized, and the jaw member 15 is secured directly to the forward surface of the vehicle top by screws 40, as shown in said figures. In so attaching the brackets, the arm 14 is spaced further away from the windshield than when applied to the standards of the windshield of an open vehicle, therefore to bring the inner longitudinal edge of the visor close to the windshield and top, the pivot bearing slides 10 are clamped to the visor panel in positions slightly forward of the positions illustrated in Figs. 2 and 3. To provide for this, a second set of bolts 42 are carried by the visor panel 4 and spaced forwardly from the bolts 9, and in making the change the slides 10 are removed from the bolts 9 and engaged over the bolts 42, the companion nuts of said bolts 42 being subsequently tightened to clamp the slides 10 in place, and the bolts 9 and their companion nuts serve as aperture closures in the same manner.

The modified form of bracket illustrated in Figs. 9 and 10 provides means for supporting vertically disposed wind deflector. These extend at an angle and beyond the sides of the windshield and are now well known in the art as "Side Wings", the type herein illustrated comprising the glass panel 45 positioned between opposed channel bars 46—46 to which is attached a vertical pivot rod 47. The bracket jaw 48 which in this instance replaces the jaw member 16 previously described, has a jaw member 49 engaging the pivot rod 47 and cooperating with a companion jaw member 50, the jaw member 50 being drawn towards the member 49 by a bolt 51 and nut 52, to frictionally clamp the pivot rod 47. A stop collar 53 is secured to the rod 47 above the clamp jaws to limit or prevent downward displacement of the deflector.

It will, of course, be understood that if desired the visor panel could be constructed of other materal such as glass, wood, wood covered with fabric or could be of skeleton frame structure covered with fabric of any desired kind, the selection of the material being optional with the manufacture of the device.

I claim:

1. In a vehicle visor, the combination of a windshield support, opposed brackets adapted for attachment to said support, a laterally disposed visor, laterally independently adjustable pivot bearing slides secured to the visor in adjusted positions and pivotally connected to their respective brackets, other laterally independently adjustable pivot bearing slides secured to the visor in adjusted positions and relatively spaced from the first named slides, and strut members connected respectively to the second named slides and their companion brackets.

2. In a vehicle visor, the combination with a windshield support, of opposed brackets adapted for attachment to said support, a laterally disposed one piece visor supported on the brackets and extending on each side beyond the brackets, and means permitting lateral adjustment of the visor relative to the brackets.

3. A vehicle visor combining a one piece visor member, opposed attaching brackets pivotally connected to said member inwardly of its marginal side edges, means permitting the brackets to be brought closer together or spread apart for attachment to vehicle windshields of various widths, and a second means maintaining the visor member in positions of angular adjustment.

4. A vehicle visor combining a one piece visor member, pivot members mounted for lateral independent movement on the under side of the visor inwardly of its respective side edges, supporting brackets each pivotally connected to one of the pivot members and adapted for attachment to a vehicle windshield, and means maintaining the visor member in positions of angular adjustment.

Signed at Los Angeles, California, this 25 day of June 1920.

LAURENCE W. SWARTS.

Witnesses:
CLARENCE B. FOSTER,
L. BELLE WEAVER.